US012801948B2

(12) United States Patent
Jiao et al.

(10) Patent No.: US 12,801,948 B2
(45) Date of Patent: Nov. 17, 2026

(54) KNOWLEDGE INJECTION MODEL FOR GENERATIVE COMMONSENSE REASONING

(71) Applicant: Microsoft Technology Licensing, LLC, Redmond, WA (US)

(72) Inventors: Jian Jiao, Bellevue, WA (US); Yeyun Gong, Beijing (CN); Nan Duan, Beijing (CN); Yameng Huang, Vancouver (CA); Ruofei Zhang, Sunnyvale, CA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 750 days.

(21) Appl. No.: 18/035,849

(22) PCT Filed: Nov. 12, 2020

(86) PCT No.: PCT/CN2020/128481

§ 371 (c)(1),
(2) Date: May 8, 2023

(87) PCT Pub. No.: WO2022/099566

PCT Pub. Date: May 19, 2022

(65) Prior Publication Data

US 2023/0394333 A1 Dec. 7, 2023

(51) Int. Cl.

*G06N 5/04* (2023.01)
*G06N 5/02* (2023.01)
*G06N 5/022* (2023.01)

(52) U.S. Cl.

CPC ................. *G06N 5/04* (2013.01); *G06N 5/02* (2013.01); *G06N 5/022* (2013.01)

(58) Field of Classification Search

CPC ............ G06N 5/04; G06N 5/02; G06N 5/022; G06N 3/045; G06N 3/0455; G06N 3/0475;

(Continued)

(56) References Cited

U.S. PATENT DOCUMENTS 8,275,786 B1 9/2012 Dave et al.
2011/0191175 A1* 8/2011 Elbaz .................... G06F 16/313 707/E17.014

(Continued)

FOREIGN PATENT DOCUMENTS

CN 1464426 A 12/2003
CN 107408156 A 11/2017

(Continued)

OTHER PUBLICATIONS

Pvs et al. “Domain Specific Corpora from the Web” 2012, European Association for Lexicography, Euralex 2012, Proceedings of the 15th Euralex International Congress, pp. 336-342 (Year: 2012).*

(Continued)

*Primary Examiner* — James D. Rutten
(74) *Attorney, Agent, or Firm* — Shook, Hardy & Bacon L.L.P.

(57) ABSTRACT

A knowledge injection model for generative commonsense reasoning. In examples, an encoder-decoder model is used to generate a model output (204) a plausible description for a set of concepts. A prototype (218) is generated from an in-domain or out-of-domain knowledge corpus, which is further used as input (202) for the encoder-decoder model. Concept input tokens and prototype input tokens are scaled to limit potential skew that may be introduced by the prototype (218). Additionally, position indicators are generated for each input token, which indicate the relative position each respective input token as compared to other input tokens. As such, when decoding the scaled encoded input (Continued)

tokens, the decoder (214) may be more attuned to the scenario bias that is introduced by the prototype (218) when generating a model output (204). Thus, the encoder-decoder model need not rely solely on the set of concepts when generating the model output (204).

20 Claims, 8 Drawing Sheets

(58) Field of Classification Search
CPC ................ G06N 3/088; G06F 16/3329; G06F 16/90332; G06F 16/9532
See application file for complete search history.

(56) References Cited

U.S. PATENT DOCUMENTS

| | | | | |
|---|---|---|---|---|
| 2014/0358964 | A1 | 12/2014 | Woods et al. | |
| 2018/0174020 | A1* | 6/2018 | Wu | G06N 3/044 |
| 2019/0287012 | A1 | 9/2019 | Celikyilmaz et al. | |
| 2020/0117738 | A1 | 4/2020 | Hassanzadeh | |
| 2020/0311070 | A1 | 10/2020 | Yan et al. | |
| 2020/0311146 | A1 | 10/2020 | Guo | |
| 2020/0311341 | A1 | 10/2020 | Chaturvedi et al. | |

FOREIGN PATENT DOCUMENTS

| | | | |
|---|---|---|---|
| JP | 2004326596 | A | 11/2004 |
| WO | 2020205047 | A1 | 10/2020 |

OTHER PUBLICATIONS

Extended European search report received in European Application No. 20961123.5, mailed on Jul. 5, 2024, 9 pages.
First Office Action Received for Chinese Application No. 202080107084.2, mailed on Dec. 25, 2024, 14 Pages (English Translation Provided).
Anderson, et al., "SPICE: Semantic Propositional Image Caption Evaluation", In Proceedings of 14th European Conference Computer Vision, Oct. 11, 2016, pp. 382-398.
Banerjee, et al., "METEOR: An Automatic Metric for MT Evaluation with Improved Correlation with Human Judgments", In Proceedings of the ACL Workshop on Intrinsic and Extrinsic Evaluation Measures for Machine Translation and/or Summarization, Jun. 29, 2005, pp. 65-72.
Bao, et al., "UniLMv2: Pseudo-Masked Language Models for Unified Language Model Pre-Training", In Repository of arXiv:2002.12804v1, Feb. 28, 2020, 11 Pages.
Bowman, et al., "A large Annotated Corpus for Learning Natural Language Inference", In Proceedings of Conference on Empirical Methods in Natural Language Processing, Sep. 17, 2015, pp. 632-642.
Cao, et al., "Retrieve, Rerank and Rewrite: Soft Template Based Neural Summarization", In Proceedings of the 56th Annual Meeting of the Association for Computational Linguistics, vol. 1, Jul. 15, 2018, pp. 152-161.
Devlin, et al., "BERT: Pre-training of Deep Bidirectional Transformers for Language Understanding", In Repository of arXiv:1810.04805v1, Oct. 11, 2018, 14 Pages.
Dong, et al., "Unified Language Model Pre-training for Natural Language Understanding and Generation", In Proceedings of 33rd Annual Conference on Neural Information Processing Systems, Dec. 8, 2019, pp. 1-13.
Fan, et al., "An Enhanced Knowledge Injection Model for Commonsense Generation", In Repository of arXiv:2012.00366v1, Dec. 1, 2020, 12 Pages.
Gu, et al., "Incorporating Copying Mechanism in Sequence-to-Sequence Learning", In Repository of arXiv:1603.06393v1, Mar. 21, 2016, 12 Pages.
Gu, et al., "Levenshtein Transformer", In Proceedings of Advances in Neural Information Processing Systems, vol. 32, Dec. 8, 2019, 11 Pages.
Guu, et al., "Generating Sentences by Editing Prototypes", In Journal of Transactions of the Association for Computational Linguistics, vol. 6, Jul. 1, 2018, pp. 437-450.
Hashimoto, et al., "A Retrieve-and-Edit Framework for Predicting Structured Outputs", In Proceedings of the 32nd International Conference on Neural Information Processing Systems, Dec. 3, 2018, 11 Pages.
Hossain, et al., "Simple and Effective Retrieve-Edit-Rerank Text Generation", In Proceedings of the 58th Annual Meeting of the Association for Computational Linguistics, Jul. 5, 2020, pp. 2532-2538.
Ji, et al., "An Information Retrieval Approach to Short Text Conversation", In Repository of arXiv:1408.6988v1, Aug. 29, 2014, pp. 1-21.
Kingma, et al., "Adam: A Method for Stochastic Optimization", In Repository of arXiv:1412.6980v1, Dec. 22, 2014, pp. 1-9.
Krishna, et al., "Dense-Captioning Events in Videos", In Proceedings of IEEE International Conference on Computer Vision, Oct. 22, 2017, pp. 706-715.
Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
Lin, et al., "Automatic Evaluation of Summaries using N-gram Co-Occurrence Statistics", In Proceedings of the Human Language Technology Conference of the North American Chapter of the Association for Computational Linguistics, May 2003, pp. 71-78.
Lin, et al., "CommonGen: A Constrained Text Generation Challenge for Generative Commonsense Reasoning", In Repository of arXiv:1911.03705v2, May 2, 2020, 13 Pages.
Lin, et al., "KagNet: Knowledge-Aware Graph Networks for Commonsense Reasoning", In Proceedings of Conference on Empirical Methods in Natural Language Processing and the 9th International Joint Conference on Natural Language Processing, Nov. 3, 2019, pp. 2829-2839.
Lv, et al., "Graph-Based Reasoning over Heterogeneous External Knowledge for Commonsense Question Answering", In Proceedings of the AAAI Conference on Artificial Intelligence, vol. 34, Issue 05, Apr. 3, 2020, pp. 8449-8456.
Mostafazadeh, et al., "LSDSem 2017 Shared Task: The Story Cloze Test", In Proceedings of the 2nd Workshop on Linking Models of Lexical, Sentential and Discourse-level Semantics, Apr. 3, 2017, pp. 46-51.
Ostermann, et al., "MCScript2.0: A Machine Comprehension Corpus Focused on Script Events and Participants", In Repository of arXiv:1905.09531v1, May 23, 2019, 15 Pages.
Pandey, et al., "Exemplar Encoder-Decoder for Neural Conversation Generation", In Proceedings of the 56th Annual Meeting of the Association for Computational Linguistics, vol. 1: Long Papers, Jul. 15, 2018, pp. 1329-1338.
Papineni, et al., "BLEU: A Method for Automatic Evaluation of Machine Translation", In Proceedings of the 40th Annual Meeting of the Association for Computational Linguistics, Jul. 6, 2002, pp. 311-318.
"International Search Report and Written Opinion Issued in PCT Application No. PCT/CN20/128481", Mailed Date: May 27, 2021, 10 Pages.
Peng, et al., "Text Generation with Exemplar-based Adaptive Decoding", In Repository of arXiv:1904.04428v1, Apr. 9, 2019, 12 Pages.
Radford, et al., "Language Models are Unsupervised Multitask Learners", In Journal of OpenAI Blog, vol. 1, Issue 8, Feb. 24, 2019, 24 Pages.
Raffel, et al., "Exploring The Limits of Transfer Learning With A Unified Text-to-Text Transformer", In Repository of arXiv:1910.10683v1, Oct. 23, 2019, pp. 1-52.
Rajani, et al., "Explain Yourself! Leveraging Language Models for Commonsense Reasoning", In repository of arXiv:1906.02361v1, Jun. 6, 2019, 11 Pages.

(56) References Cited

OTHER PUBLICATIONS

Rashkin, et al., "Event2Mind: Commonsense Inference on Events, Intents, and Reactions", In repository of arXiv:1805.06939v1, May 17, 2018, 13 Pages.
Rush, et al., "A Neural Attention Model for Abstractive Sentence Summarization", In Proceedings of the Conference on Empirical Methods in Natural Language Processing, Sep. 17, 2015, pp. 379-389.
Sap, et al., "Atomic: An Atlas of Machine Commonsense for if-then Reasoning", In Proceedings of the AAAI Conference on Artificial Intelligence, vol. 33, Issue 1, Jul. 17, 2019, pp. 3027-3035.
Song, et al., "Two are Better than One: An Ensemble of Retrieval- and Generation-Based Dialog Systems", In repository of arXiv:1610.07149v1, Oct. 23, 2016, pp. 1-11.
Talmor, et al., "Commonsenseqa: A Question Answering Challenge Targeting Commonsense Knowledge", In Repository of arXiv:1811.00937v1, Nov. 2, 2018, 10 Pages.
Vaswani, et al., "Attention is All you Need", In Proceedings of Advances in Neural Information Processing Systems, vol. 30, Dec. 4, 2017, pp. 1-11.
Vedantam, et al., "Cider: Consensus-Based Image Description Evaluation", In Proceedings of the IEEE Conference on Computer Vision and Pattern Recognition, Jun. 7, 2015, pp. 4566-4575.
Wang, et al., "VATEX: A Large-Scale, High-Quality Multilingual Dataset for Video-and-Language Research", In Proceedings of the IEEE/CVF International Conference on Computer Vision, Oct. 27, 2019, pp. 4581-4591.
Weston, et al., "Retrieve and Refine: Improved Sequence Generation Models For Dialogue", In Proceedings of the EMNLP Workshop SCAI: The 2nd International Workshop on Search-Oriented Conversational AI, Oct. 31, 2018, pp. 87-92.
Wu, et al., "Response Generation by Context-Aware Prototype Editing", In Proceedings of the AAAI Conference on Artificial Intelligence, vol. 33, Issue 1, Jul. 17, 2019, pp. 7281-7288.
Yan, et al., "Learning to Respond with Deep Neural Networks for Retrieval-Based Human-Computer Conversation System", In Proceedings of the 39th International ACM SIGIR Conference on Research and Development in Information Retrieval, Jul. 17, 2016, pp. 55-64.
Yan, et al., "ProphetNet: Predicting Future N-gram for Sequence-to-Sequence Pre-training", In Repository of arXiv:2001.04063v1, Jan. 13, 2020, 10 Pages.
Zellers, et al., "Hellaswag: Can A Machine Really Finish your Sentence?", In Repository of arXiv:1905.07830v1, May 19, 2019, pp. 1-14.
Zellers, et al., "Swag: A Large-Scale Adversarial Dataset for Grounded Commonsense Inference", In Repository of arXiv:1808.05326v1, Aug. 16, 2018, pp. 1-15.
Communication pursuant to Rules 70(2) and 70a(2 received in European Application No. 20961123.5, mailed on Jul. 23, 2024, 1 page.
Notice of Allowance Received for Chinese Application No. 202080107084.2, mailed on Apr. 25, 2025, 04 Pages (English Translation Provided).

* cited by examiner

KNOWLEDGE INJECTION MODEL FOR GENERATIVE COMMONSENSE REASONING

CROSS-REFERENCE TO RELATED APPLICATION

This application is the U.S. national phase of the International Patent Application PCT/CN2020/128481, filed Nov. 12, 2020, the entire content of which is incorporated herein by reference.

BACKGROUND

A set of concepts may be processed according to generative commonsense reasoning techniques to generate a plausible description based on the concepts. However, processing the concepts in a vacuum may not be sufficient to yield a description that is plausible. Rather, the resulting model output may, at least in some instances, be illogical or nonsensical.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a knowledge injection model for generative commonsense reasoning. In examples, an encoder-decoder model is used to generate a model output (e.g., a plausible description or descriptive sentence) based on an input comprising a set of concepts. A prototype is generated based on the set of concepts, which is further used as input for the encoder-decoder model. The prototype may be generated from one or more in-domain and/or out-of-domain knowledge corpora. A scaling engine scales concept input tokens and prototype input tokens of the input to reduce the likelihood that prototype input tokens that overlap with concept input tokens skew the model output. For example, a norm of an encoder output state associated with a prototype input token may be increased if the prototype input token is likely to contribute to the generation, while the norm may instead be decreased when there is a conflict between the prototype input token and the concept input tokens.

Additionally, position indicators are generated for each input token, which provide an indication of the relative position each respective input token as compared to other input tokens. As such, when decoding the scaled encoded input tokens, the decoder may be more attuned to the scenario bias that is introduced by the generated prototype when generating a model output. Thus, the encoder-decoder model need not rely solely on the set of concepts when generating the model output and may instead further incorporate a prototype generated from a knowledge corpus based on the instant scaling and position indicator techniques.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

REFERENCES

The following publications are incorporated by reference in their entirety:

1. "An Enhanced Knowledge Injection Model for Commonsense Generation" paper (12 pages) (copy attached).
2. Bill Yuchen Lin, Ming Shen, Wangchunshu Zhou, Pei Zhou, Chandra Bhagavatula, Yejin Choi, and Xiang Ren. 2019b. Commongen: A constrained text generation challenge for generative commonsense reasoning. CoRR, abs/1911.03705.
3. Mike Lewis, Yinhan Liu, Naman Goyal, Marjan Ghazvininejad, Abdelrahman Mohamed, Omer Levy, Ves Stoyanov, and Luke Zettlemoyer. 2019. Bart: Denoising sequence-to-sequence pre-training for natural language generation, translation, and comprehension. arXiv preprint arXiv:1910.13461.

BRIEF DESCRIPTION OF THE DRAWINGS

Non-limiting and non-exhaustive examples are described with reference to the following Figures.

DETAILED DESCRIPTION

Figure 1:
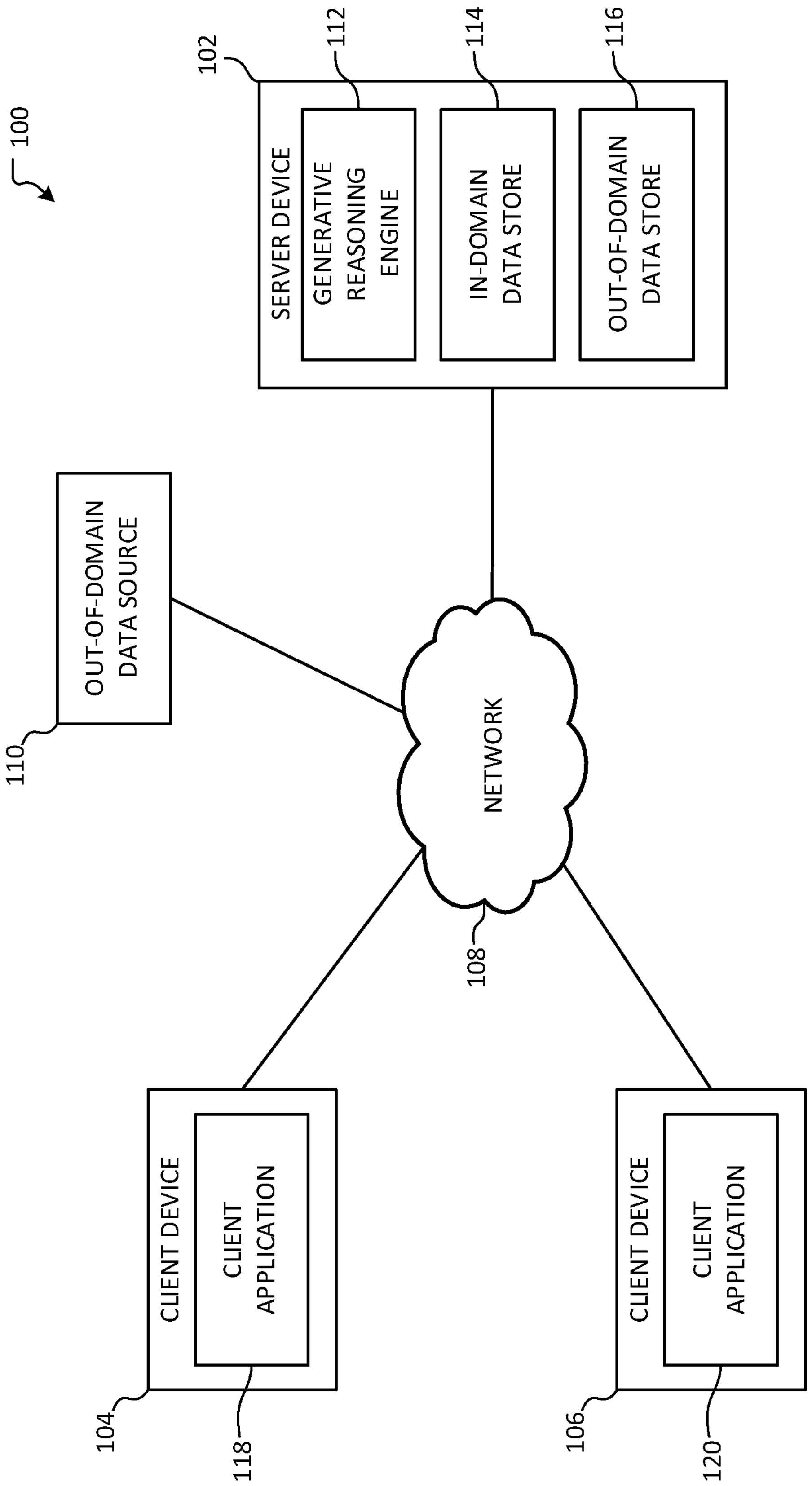
FIG. 1 illustrates an overview of an example system in which the knowledge injection model described herein may be utilized.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, generative commonsense reasoning is used to generate a plausible description from a set of concepts. As compared to the set of concepts, the generated description may enable improved data retrieval, such that a greater amount and/or more accurate set of data is identified that is responsive to a user query. As another example, the generated description may be more easily understandable by a user or may be used as an alternative to requesting additional information from the user, thereby reducing the cognitive and knowledge burdens on the user and also reducing the amount of time the user needs to spend inputting information. For example, a descriptive sentence may be generated for an image based on a set of associated tags (e.g., as may be generated using computer vision techniques and/or provided by users). As another example, a set of concepts may be provided with targeted content, such that a descriptive headline and/or a descriptive summary may be generated for the targeted content. The descriptive headline and/or summary may be used to identify targeted content that is relevant to the user or, as another example, a search query from a user may be used to generate a descriptive string with which to identify such targeted content. Thus, it will be appreciated that generative reasoning and the associated aspects described herein have applicability in a variety of contexts.

Examples of generative commonsense reasoning include, but are not limited to, Situations With Adversarial Generations (SWAG), CommonsenseQA and CommonGen. For example, SWAG infers a probably subsequent event based on a given textual description of an event. As another example, CommonsenseQA focuses on commonsense question answering by describing a relationships between concepts from a semantic network such as ConceptNet. Different from the discriminative tasks performed by SWAG and CommonsenseQA, CommonGen is an example that is trained according to background commonsense knowledge so as to provide a computational generation capability. Thus, it will be appreciated that aspects of the present disclosure are applicable in any of a variety of generative commonsense reasoning contexts.

For example, given the set of concepts "dog," "Frisbee," "catch," "throw," a resulting plausible description may be "the dog catches the Frisbee when the boy throws it." However, processing the set of concepts in a vacuum (e.g., absent additional context) may yield a description that is not plausible. For example, the generated description may instead be "two dogs are throwing Frisbees to each other." Thus, in the absence of additional context (e.g., dogs typically catch Frisbees or dogs cannot throw Frisbees), generative commonsense reasoning may fail to prioritize certain concept combinations and may instead yield descriptions that are implausible or otherwise fail to make logical sense.

Accordingly, aspects of the present disclosure relate to a knowledge injection model for generative commonsense reasoning. As an example, a prototype is generated from an in-domain knowledge corpus and/or an out-of-domain knowledge corpus based on a set of concepts. The prototype is combined with the set of concepts to generate an input (e.g., comprising input tokens) that is processed using a pre-trained model. A scaling factor is assigned to each input token encoded by the model. In examples, the scaling factor is generated so as to reduce attention weights for certain input tokens associated with the prototype, thereby reducing the likelihood that a prototype input token that overlaps with a concept input token receives a skewed attention weight. Additionally, surrounding input tokens may describe how concepts interact with one another. As such, a position indicator may be generated for each input token, which provides an indication of the relative position of an input token as compared to other input tokens. As a result, a decoder processing the encoded tokens in view of the position indicators is more attuned to the scenario bias that is introduced by the generated prototype when generating a model output.

Examples are described herein with respect to using an encoder-decoder model, such as BART. The encoder-decoder model may comprise one or more encoder layers, where each encoder layer is composed of a self-attention network and a feed-forward network. An encoder layer may further comprise an encoder-decoder attention mechanism between the self-attention network and the feed-forward network. Similarly, the encoder-decoder model may comprise one or more decoder layers, where each decoder layer may comprise a self-attention network and a feed-forward network. While examples are discussed in the context of using a BART encoder-decoder model, it will be appreciated that any of a variety of other generative models (e.g., comprising an encoder and a decoder) may be used.

An example set of equations associated with an encoder-decoder attention mechanism is provided below. A set of input tokens (e.g., comprising the set of concepts and an associated generated prototype) may be encoded into a hidden state or encoder output sequence $\mathcal{H}=(h_1, \ldots, h_{n_h})$.

$$s_x(d_u,h_v)=(W_{x,q}d_u)^T(W_{x,k}h_v)/\sqrt{d_k}$$

$$a_x=\text{softmax}(s_x(d_u,h_1), \ldots, (d_u,h_{n_h}))$$

$$v_u=W_O[W_{1,v}\mathcal{H}a_1, \ldots, W_{X,v}\mathcal{H}a_X]$$

$$\hat{d}_u=LN(d_u+v_u)$$

In the example equation above, $d_u$ is input into a decoder and $h_v$ is output from an encoder. Additionally, x denotes the xth attention head, while $\{W_{x,q}, W_{x,k}, W_{x,v}\} \in \mathbb{R}^{d_k \times d}$ are trainable parameters for queries, keys, and values, d is the size of the hidden state sequence, $d_k$ is the attention head dimension, and LN is the layernorm function.

A set of concepts may be in any of a variety of forms. For example, the set of concepts may be received from a user or may be generated from a sentence. In some examples, the set of concepts is a set of keywords from a user or generated from metadata, among other examples. Accordingly, a prototype is generated based on the set of concepts. As used herein, a prototype comprises background knowledge to improve model output from an encoder-decoder model. The prototype may be a sentence or a search snippet associated with a search result that is responsive to a user's search query, among other examples. The prototype may be generated from an in-domain and/or an out-of-domain knowledge corpus. For example, if the set of concepts relates to common scenarios, example in-domain external knowledge corpora include, but are not limited to, VaTex (Wang et al., 2019), SNLI (Bowman et al., 2015), Activity (Krishna et al., 2017), or the training set of CommonGen.

However, such an in-domain corpus may have difficulty generalizing to other domains. Accordingly, an out-of-domain knowledge corpus (e.g., Wikipedia, a website, or a social network) may be used (e.g., either as an alternative to or in addition to an in-domain knowledge corpus) to generate the prototype. One or more information retrieval techniques may be used to generate the prototype from a knowledge corpus, such as keyword searching, exact or inexact matching techniques, or graph searching techniques for an ontological graph database, among other examples.

The generated prototype may be combined with the set of concepts to generate an input for the encoder-decoder model. For example, an input $\mathcal{S}=[\mathcal{C}, \mathcal{O}]$, such that the input tokens may be $[c_1, \ldots, c_{n_c}, o_1, \ldots, o_{n_{n_o}}]$. However, there may be an overlap between prototype input tokens and concept input tokens, such that more attention weight is given to certain input tokens as a result and, in some examples, additional noise may be introduced.

Accordingly, a scaling engine may generate a scaling factor for each input token. In some examples, scaling factors may be used as an alternative to utilizing a simple hard mask that omits concept input tokens that are not also present as prototype input tokens. The scaling engine may increase the norm of an encoder output state associated with a prototype input token (e.g., $h_v$ in the equations above) if the prototype input token is likely to contribute to the generation and decrease the norm of the associated encoder output state when there is a conflict between the prototype input token and the concept input tokens. An example set of equations that may be used by a scaling engine is provided below.

$$\Lambda=\mathrm{Sigmoid}(W_2\mathrm{ReLU}(W_1h_v+b_1)+b_2)$$

$$h_v=h_v\odot(2\times\Lambda)$$

In the instant example, $W_1\in\mathbb{R}^{d_s\times d}$, $W_2\in\mathbb{R}^{d\times d_s}$, $b_1\in\mathbb{R}^{d_s}$, $b_2\in\mathbb{R}^{d}$ in are trainable parameters to tune the scaling engine. In some instances, the parameters may be initialized with N(0, var), where var is a small value, such that scaling factors generated by the scaling engine do not substantially impair operation of the encoder-decoder model.

Additionally, prototype input tokens that co-occur with output tokens $\mathcal{T}$ of the encoder-decoder model may likely be more important than other tokens when generating the model output. As a result, an encoder classification task may be used to cause the scaling engine to determine which tokens should be present in the generated output. An example loss function is illustrated below, which may be used by the scaling engine of the encoder to perform such classification.

$$\mathcal{L}_E=-\Sigma_{s_v\in S}(\mathcal{I}_{\{s_v\in\mathcal{T}\}}\log\mathrm{Mean}(\Lambda_v)+\mathcal{I}_{\{s_v\notin\mathcal{T}\}}\log(1-\mathrm{Mean}(\Lambda_v)))$$

In the above example, $\mathcal{I}$ is an indicator function, such that $\mathcal{I}=0$ if $s_v\in\mathcal{T}$ or, in the alternative when $s_v\notin\mathcal{T}$, $\mathcal{I}=1$.

As noted above, in addition to (or, in some examples, as an alternative to) utilizing the scaling engine, a position indicator may be generated to inform the decoder of a position for an input token. Such position indicators may enable the decoder to more effectively identify and incorporate scenario bias that may be introduced through the prototype. As an example, a position indicator for a given token may be determined according to its proximity to concept input tokens.

For example, concept input tokens within the input may each receive a value of "0," while prototype input tokens may receive values of "1" or more. For the set of concept input tokens "dog" and "thrown," prototype tokens comprising "the Frisbee was thrown to the dog" (which may instead be represented as a list comprising each token) may receive position indicators 4, 3, 2, 1, 2, 2, 1. In the instant example both "to" and "the" receive position indicators of "2" as they are each proximate to prototype token that is also a concept input token (e.g., "thrown" and "dog," respectively). Thus, the position indicator may be determined according to a minimum proximity to a concept input token. In the alternative, the second "the" would instead receive a position token of "3" in relation to "thrown" rather than the previously discussed position indicator of "2" in relation to "dog."

Accordingly, the generated set of position indicators may be incorporated into the encoder-decoder attention mechanism according to the example set of equations below. As illustrated, the above-described technique for generating a position indicator for a given input token is implemented as function $D(s_v)$ and $E_D$ is the embedding for those distance values in D.

$$ED(h_v)=E_D(D(s_v))$$

$$S(d_u,h_v)=(W_qd_u)^T(W_kh_v+ED(h_v))/\sqrt{d_k}$$

Thus, incorporating $ED(h_v)$ into the attention equation show above enables the decoder to incorporate an associated position indicator when processing encoder output $h_v$ to better learn effective scenario bias resulting from the generated prototype. As an example, applying generative commonsense reasoning to a set of concepts "ear," "feel," "pain," "pierce" in a vacuum may yield an output similar to "I can feel the pain in my ears and feel the pierce in my neck from the piercing." However, incorporating a prototype of "if you pierce your hand, you also feel pain" injects additional knowledge into the processing performed by the encoder-decoder model, thereby enabling the model to include scenario bias when processing the set of concepts. As such, a resulting output may instead be "one feels the pain of having an ear pierced."

It will be appreciated that aspects of the present disclosure may be used during a generation phase (e.g., of a pre-trained encoder-decoder model) and/or during a training phase. For example, a loss function $\mathcal{L}$ may incorporate $\mathcal{L}_E$, as was discussed above. The loss function may further incorporate $\mathcal{L}_D$ defined below to maximize the log-likelihood for $\mathcal{T}$ given $\mathcal{C}$ and $\mathcal{O}$.

$$\mathcal{L}_D=-\log\Sigma_kP(t_k|\mathcal{O},\mathcal{C},t_{<k})$$

$$\mathcal{L}=\mathcal{L}_D+\lambda\mathcal{L}_E$$

In the example above, $t_k$ is the kth token in $\mathcal{T}$ and $t_{<k}$ are the first (k−1) tokens in $\mathcal{T}$. Additionally, during model training, λ may be used to balance $\mathcal{L}_D$ and $\mathcal{L}_E$ to improve performance of the encoder-decoder model.

It will be appreciated that aspects of the present disclosure have applicability in a variety of contexts. For example, the disclosed knowledge injection model may be used in generative commonsense reasoning scenarios where a description is generated based on a set of concepts. As an example, a set of tags may be generated for an image using computer vision techniques or based on user-submitted tags, such that a descriptive sentence for the image may be generated accordingly. The descriptive sentence may be supplied to a client computing device as an alternate text tag associated with the image.

As another example, a set of concepts may be provided with targeted content, such that a descriptive headline and/or a descriptive summary may be generated for the targeted content. The targeted content may be provided to a user device based on a query from the user device being matched to the descriptive headline and/or the descriptive summary. As a further example, a descriptive query may be generated from a set of concepts of a user query received from a user device (e.g., as a search query string). Targeted content may be identified on the descriptive query. Thus, the disclosed techniques may enable improved targeted content identification and distribution, thereby enabling the identification and display of relevant content to a user that may not have otherwise been determined to be responsive to a user query. Additionally, the disclosed aspects may improve an associated user experience, as a user need not supply as much information to a computer system, thereby reducing the cognitive and knowledge burdens on the user and also reducing the amount of time the user needs to spend inputting information. Rather, the generative commonsense reasoning techniques and associated knowledge injection model serve to supplement the amount of information used so as to generate a more complete representation of a concept that may have been provided by a user.

FIG. 1 illustrates an overview of an example system 100 in which the knowledge injection model described herein may be utilized. As illustrated, system 100 comprises server device 102, client device 104, client device 106, network 108, and out-of-domain data source 110. In examples, server device 102, out-of-domain data source 110, and client devices 104 and 106 communicate using network 108, which may comprise a local area network, a wireless network, or the Internet, or any combination thereof, among other examples.

Server device 102 and out-of-domain data source 110 may each be any of a variety of computing devices, including, but not limited to, a server computing device or a set of computing devices that form a distributed computing device. Similarly, client devices 104 and 106 may each be any of a variety of computing devices, including, but not limited to, a mobile computing device, a laptop computing device, a tablet computing device, or a desktop computing device. It will be appreciated that while system 100 is illustrated as comprising one server device 102, two client devices 104 and 106, and one out-of-domain data source 110, any number of such elements may be used in other examples. Further, the functionality described herein with respect to server device 102, client devices 104 and 106, and out-of-domain data source 110 may be distributed among or otherwise implemented on any number of different computing devices in any of a variety of configurations in other examples. For example, client device 104 may comprise an out-of-domain data source similar to out-of-domain data source 110, which may be used as a knowledge corpus from which to generate a prototype according to aspects disclosed herein.

Client device 104 is illustrated as comprising client application 118, which may be any of a variety of applications, such as a web application executing in a web browser, a native application, or a combination thereof. For example, a user of client device 104 may employ client application 118 to navigate to a website associated with server device 102 via which to provide a set of concepts. Similarly, client device 106 is illustrated as comprising client application 120. Aspects of client device 106 are similar to those of client device 104 and are therefore not necessarily re-described below in detail.

As an example, client application 118 may display a website at which a user may enter a query to search for content. The query may be transmitted to server device 102, which may extract a set of concepts from the query. Generative reasoning engine 112 may generate a prototype based on the set of concepts (e.g., from in-domain data store 114, out-of-domain data store 116, and/or out-of-domain data source 110). Generative reasoning engine 112 may then generate a model output based on an input comprising the set of concepts and the generated prototype. The model output may be used to identify targeted content relating to the user's query, which may be transmitted to client device 104 and transmitted by client application 118 alongside search results that are responsive to the user's search query. It will be appreciated that the set of concepts need not be received as a search query in other examples. For example, an application programming interface (API) may be used by client application 118 to provide the set of concepts to server device 102 and to receive model output generated by generative reasoning engine 112 and/or other associated processing results.

As another example, client application 118 may enable a user to enter a set of keywords associated with targeted content, which may be provided to server device 102 for processing according to aspects described herein. Generative reasoning engine 112 may process the inputs and generate one or more model outputs comprising a descriptive headline and/or a descriptive summary for targeted content associated with the set of concepts. In examples, the targeted content, descriptive headline, and/or descriptive summary may be stored by server device 102 for subsequent use (e.g., to provide the targeted content in association with search results that are responsive to a user's search query). As another example, the set of concepts and generated model outputs may be received and transmitted, respectively, via an API. Thus, it will be appreciated that the disclosed aspects may be implemented according to any of a variety of paradigms (e.g., as a service via an API, according to client/server methodology, or local to a client device, among other examples).

Server device 102 comprises generative reasoning engine 112, in-domain data store 114, and out-of-domain data store 116. Generative reasoning engine 112 processes a set of concepts to generate a prototype. The prototype may be generated based on a knowledge corpus, as may be stored by or otherwise accessed from in-domain data store 114, out-of-domain data store 116, and/or out-of-domain data source 110. For example, out-of-domain data source 110 may be a third-party data source, such a social network or an online knowledge repository (e.g., an online encyclopedia or a knowledgebase website), among other examples. In some instances, in-domain or out-of-domain data may be accessed or otherwise received from a client device. Thus, a knowledge corpus need not be confined to server device 102. One or more information retrieval techniques may be used to generate the prototype from a knowledge corpus, such as keyword searching, exact or inexact matching techniques, or graph searching techniques for an ontological graph database, among other examples.

In examples, generative reasoning engine 112 processes a set of concepts in combination with the generated prototype to generate a model output according to aspects of the present disclosure. The concepts and prototype form an input comprising input tokens as described herein. Example concepts include, but are not limited to, a word, a topic, or a phrase. Thus, returning to the example above, concepts may be extracted from a search query according to word boundaries or based on identifying one or more topics therein, among other examples. Model output generated by generative reasoning engine 112 may take any of a variety of forms. For example, generative reasoning engine 112 may generate one or more sentences (e.g., the descriptive headline or descriptive summary in the examples above) or may utilize a model output to subsequently identify associated content (e.g., the targeted content in the example above). While example concepts and resulting model outputs are described herein, it will be appreciated that any of a variety of other inputs and outputs may be used according to the techniques described herein.

Figure 2:
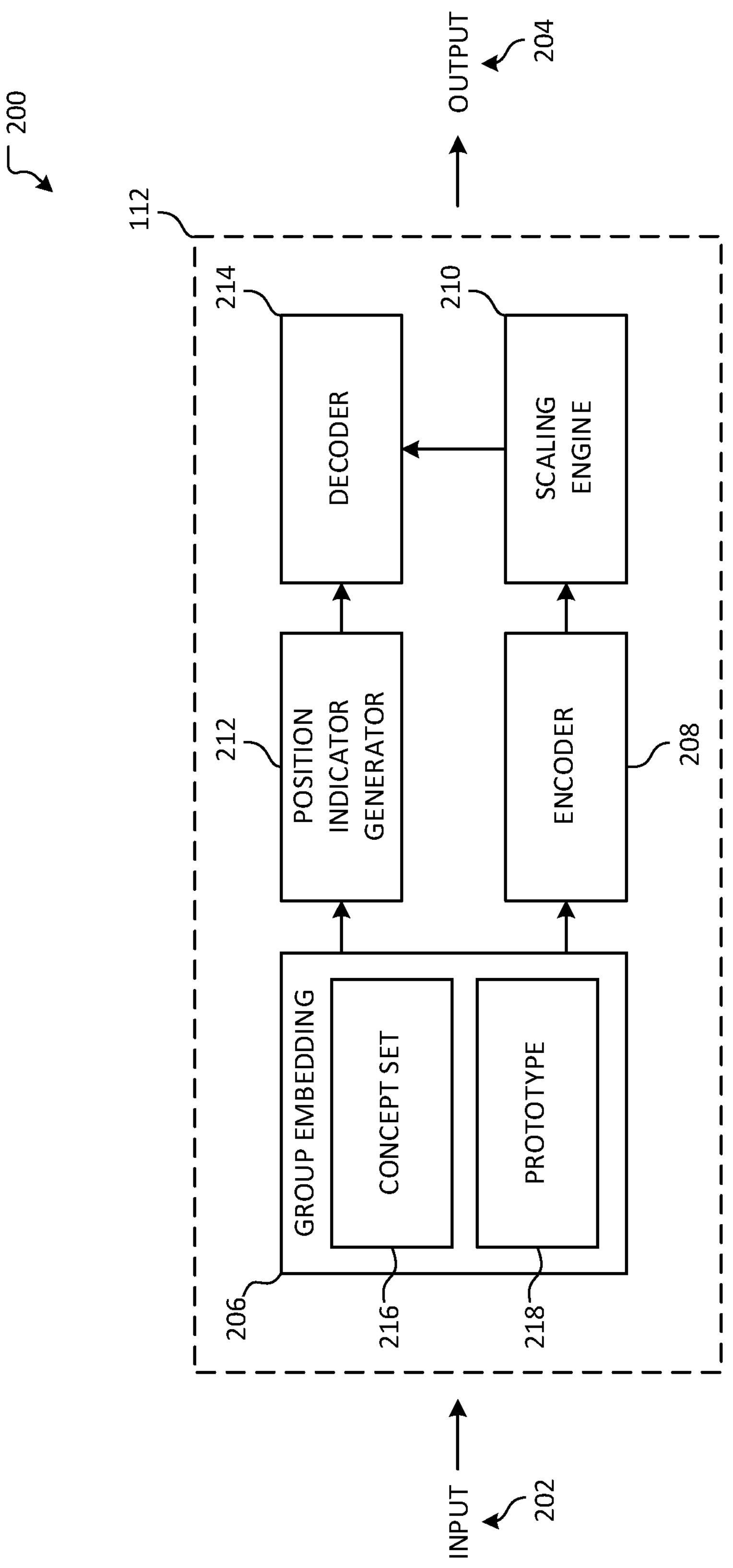
FIG. 2 illustrates an overview of an example framework for generative commonsense reasoning according to the disclosed knowledge injection model.

FIG. 2 illustrates an overview of an example framework 200 for generative commonsense reasoning according to the disclosed knowledge injection model. As illustrated by the dashed box, framework 200 may be implemented by generative reasoning engine 112 in FIG. 1A. In examples, framework 200 is based on an encoder-decoder model, such as BART.

Input 202 is a set of concepts, which, in some examples, may be received from a client device such as client device 104 or 106 in FIG. 1. Group embedding 206 comprises a set of input tokens based on input 202, which are illustrated as concept set 216 and prototype 218. For example, prototype 218 may be generated by generative reasoning engine 112 in FIG. 1 based on an in-domain and/or out-of-domain knowledge corpus. In examples, group embedding 206 may be generated according to the example equation below for concepts $\mathcal{C}$ and prototype $\mathcal{O}$, where $E_B$ is an original BART embedding function.

$$E(c_j)=E_B(c_j)+E^{\mathcal{C}},\ E(o_k)=E_B(o_k)+E^{\mathcal{O}}$$

As illustrated, group embedding 206 is processed by encoder 208. For example, each encoder layer of encoder 208 may be composed of a self-attention network and a feed-forward network. The encoder layer may further comprise an encoder-decoder attention mechanism between the self-attention network and the feed-forward network. Scaling engine 210 further assigns a scaling factor to each input token of concept set 216 and prototype 218. As discussed above, scaling engine 210 may increase the norm of an encoder output state associated with a prototype input token of prototype 218 if the prototype input token is likely to contribute to the generation. Conversely, scaling engine 210 may decrease the norm of the associated encoder output state when there is a conflict between the prototype input token of prototype 218 and the concept input tokens of concept set 216.

Position indicator generator 212 generates a position indicator for each input token of input 202. Such position indicators may enable decoder 214 to more effectively identify and incorporate scenario bias that may be introduced through prototype 218. As an example, a position indicator for a given token may be determined according to its proximity to an input token that is the same or similar to a concept.

Decoder 214 may comprise one or more decoder layers, where each decoder layer may comprise a self-attention network and a feed-forward network. In examples, decoder 214 generates model output 204 based on scaling factors generated by scaling engine 210 for encoded group embeddings generated by encoder 208, as well as position indicators generated by position indicator generator 212. As discussed above, scaling engine 210 ensures that input tokens of concept set 216 do not receive skewed attention as a result of potential overlap with prototype 218. Additionally, as a result of decoder 214 incorporating the position indicators generated by position indicator generator 212, decoder 214 is more effective in incorporating scenario bias resulting from the generated prototype as compared to processing the set of concepts alone.

Figure 3:
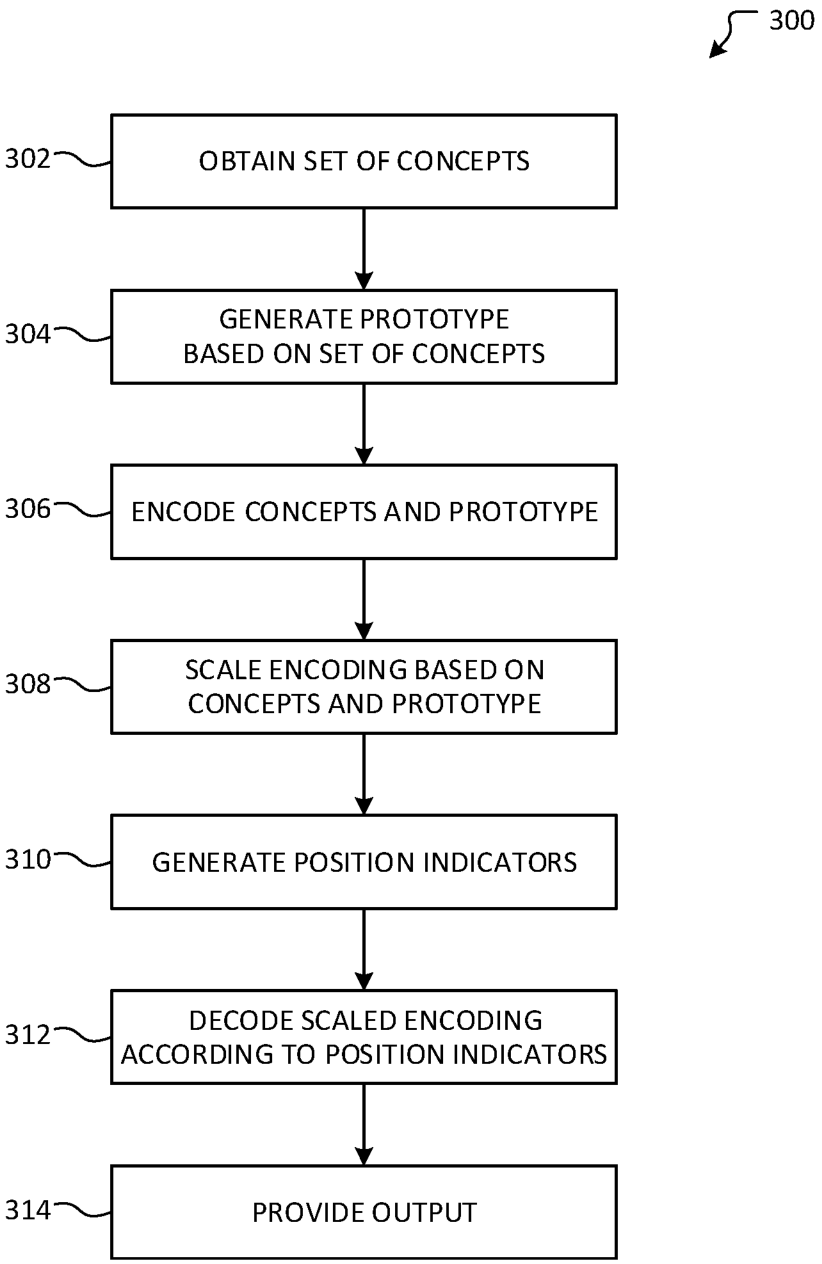
FIG. 3 illustrates an overview of an example method for processing a set of concepts according to the disclosed knowledge injection model for generative commonsense reasoning.

FIG. 3 illustrates an overview of an example method 300 for processing a set of concepts according to the disclosed knowledge injection model for generative commonsense reasoning. In examples, aspects of method 300 are performed by a generative reasoning engine, such as generative reasoning engine 112 in FIGS. 1 and 2. Method 300 begins at operation 302, where a set of concepts is obtained (e.g., received, generated, etc.). In examples, the set of concepts is received from a client device, such as client device 104 or 106 in FIG. 1. As another example, the set of concepts may be generated, as may be the case where a set of tags is generated using computer vision techniques. Example concepts include, but are not limited to, a word, a topic, or a phrase. The set of concepts may be received as a search query or other string from which the concepts may be extracted, or may be received via an API, among other examples.

Flow progresses to operation 304, where a prototype is generated based on the set of concepts. In examples, the prototype is generated from an in-domain and/or out-of-domain knowledge corpus, as may be accessed from an out-of-domain data source (e.g., out-of-domain data source 110 in FIG. 1) or stored by an in-domain data store (e.g., in-domain data store 114) or an out-of-domain data store (e.g., out-of-domain data store 116). One or more information retrieval techniques may be used to generate the prototype from a knowledge corpus, such as keyword searching, exact or inexact matching techniques, or graph searching techniques for an ontological graph database, among other examples.

In some examples, operation 304 comprises determining a knowledge corpus from a set of corpora. For example, a first corpora may be selected from a set of in-domain corpora and a second corpora may be selected from a set of out-of-domain corpora. The determination may be based on a predetermined context associated with the set of concepts or based on an analysis of the set of concepts to identify an associated in-domain and/or out-of-domain knowledge corpus. As another example, a set of prototypes may be generated from multiple corpora, such that operation 304 further comprise selecting a prototype from the set of prototypes. For example, the selection may be based on ranking the set of prototypes according to a similarity to the set of concepts or prototype length, among other examples.

At operation 306, the set of concepts and generated prototype are treated as an input to an encoder-decoder model and encoded accordingly. For example, aspects of operation 306 may be performed by an encoder, such as encoder 208 in FIG. 2. As described above, operation 306 may comprise utilizing multiple encoder layers, each of which may be comprised by a self-attention network and a feed-forward network. Additionally, each encoder layer may further comprise an encoder-decoder attention mechanism between the self-attention network and the feed-forward network. As an example, initial representations, or embeddings, may be generated for each input token. Then, using self-attention, information from all of the other input token may be aggregated and used to generate a new representation per input token informed by the entire context. In some examples, this technique is repeated multiple times for all input tokens, successively generating new representations, or embeddings.

Moving to operation 308, encoder outputs are scaled based on the set of concepts and generated prototype. In examples, aspects of operation 308 are performed by a scaling engine, such as scaling engine 210 in FIG. 2. For example, a norm of an encoder output state associated with a prototype input token may be increased at operation 308 if the prototype input token is likely to contribute to the generation (e.g., as may be determined if a prototype input token is the same as or similar to a concept). Conversely, the norm of the associated encoder output state may be decreased when there is a conflict between the prototype input token and a concept input token. In some examples, operation 308 further comprises performing an encoder classification task in which it is determined which of the encoded tokens may appear in the model output, as was discussed above. The determined encoded tokens may be prioritized and scaled accordingly. In examples, operations 306 and 308 are performed iteratively for each layer of the encoder.

Flow progresses to operation 310 where position indicators are generated. In examples, aspects of operation 310 are performed by a position indicator generator, such as position indicator generator 212 in FIG. 2. As described above, position indicators may be generated for both concepts input tokens and prototype input tokens. A position indicator for a given token may be determined according to its proximity to concept input tokens. Concept input tokens may be assigned a position indicator of "0," while prototype tokens may receive values of "1" or more. For example, an indicator value of "1" may be used if a prototype input token is the same as or similar to a concept input token, such that indicator values for other input tokens may increase with distance thereto accordingly. It will be appreciated that, while examples are described as increasing a position indicator linearly with increasing distance from a proximity input token that is the same or similar as a concept input token, other techniques may be used. For example, position indicators may be scaled multiplicatively or exponentially, or according to any of a variety of other mathematical formulas.

At operation 312, the scaled encoding outputs are decoded according to the generated position indicators. In examples, aspects of operation 312 are performed by a decoder, such as decoder 214 in FIG. 2. As noted above, the decoder may comprise one or more decoder layers, where each decoder layer may comprise a self-attention network and a feed-forward network. As an example, model output may be generated word by word while consulting the scaled representation generated by the encoder in combination with the generated position indicator. For example, the model output may be generated one word at a time (e.g., from left to right).

Flow progresses to operation 314, where the generated model output is provided. In examples, the model output is provided via an API, such that another application, process, and/or computing device may use the model output accordingly. For example, the model output may subsequently be used as a descriptive query in order to better identify content (and/or targeted content) as compared to just using a search query. As another example, operation 314 may comprise storing the generated model output (e.g., as a descriptive summary or headline associated with targeted content). Thus, it will be appreciated that the generated model output may be used in any of a variety of scenarios. Method 300 terminates at operation 314.

While method 300 is illustrated as occurring sequentially, it will be appreciated that such aspects need not be performed in the order illustrated by method 300 and may, in some examples, be performed contemporaneously. As an example, operation 310 need not be performed after operations 306 and 308 but, in some examples, may instead occur contemporaneously with at least one of operations 306 and 308.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
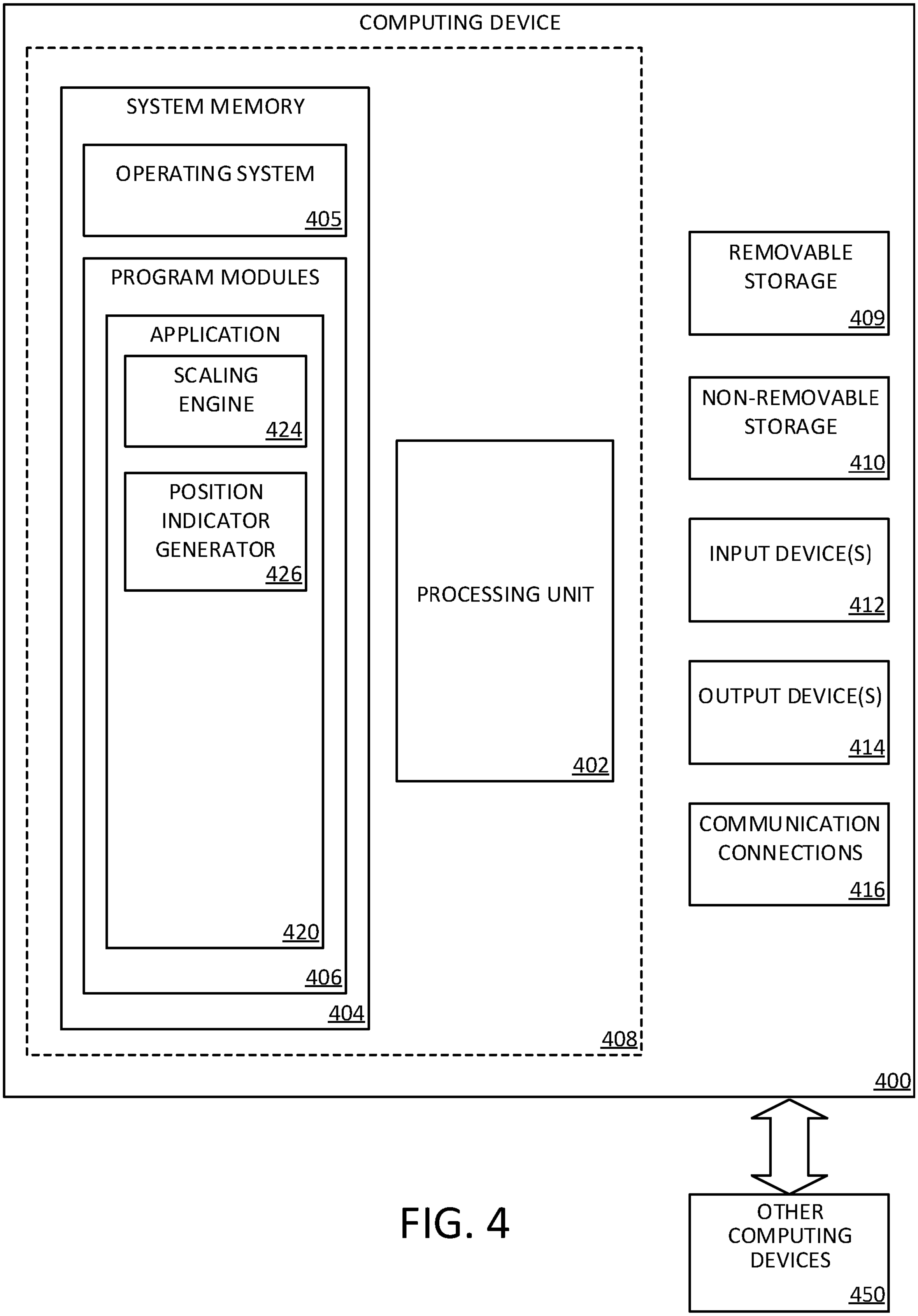
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including devices 102, 104, and 106 in FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may scaling engine 424 and position indicator generator 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
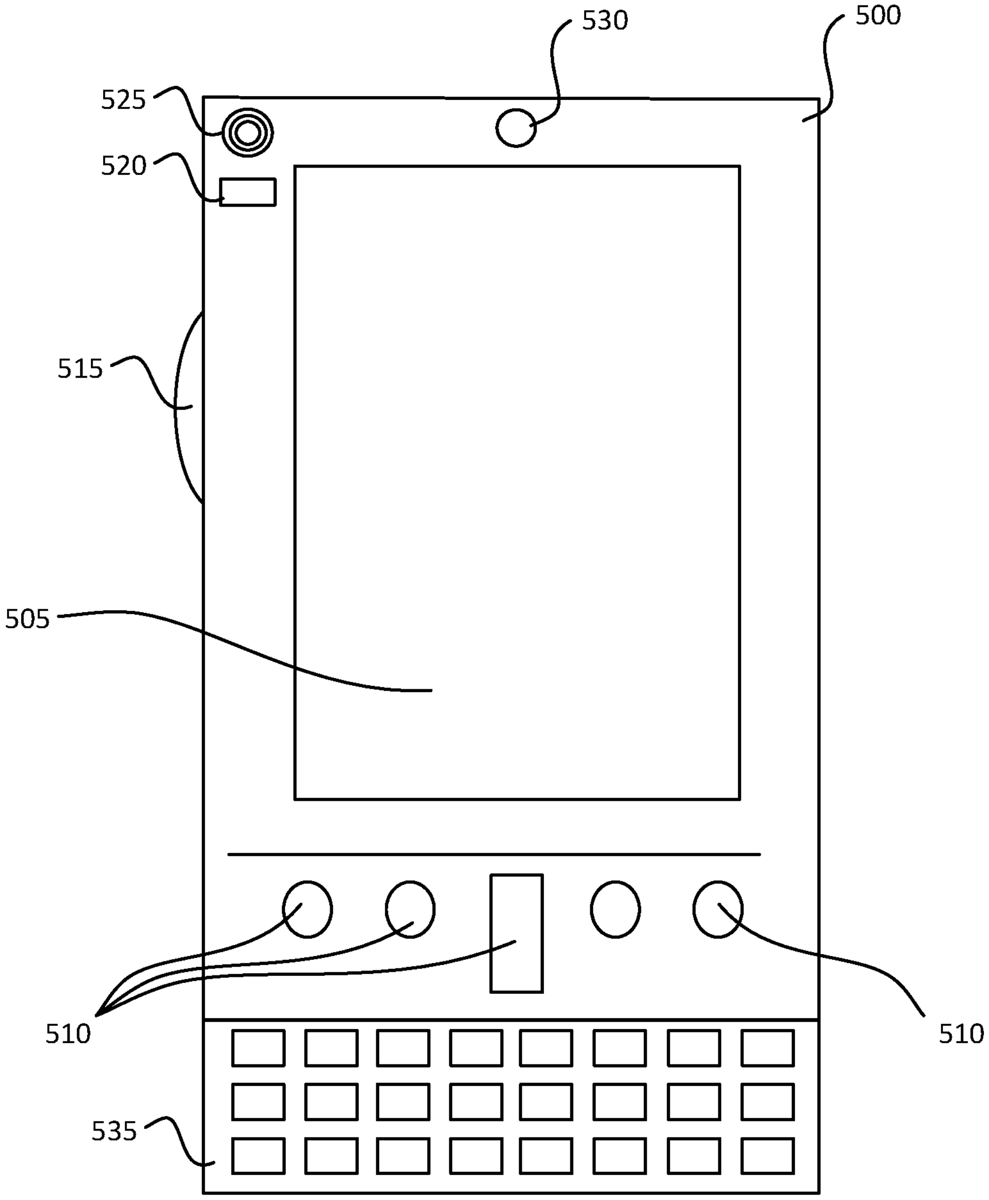
FIGS. 5A and 5B are simplified block diagrams of a mobile computing device with which aspects of the present disclosure may be practiced.
Figure 5B:
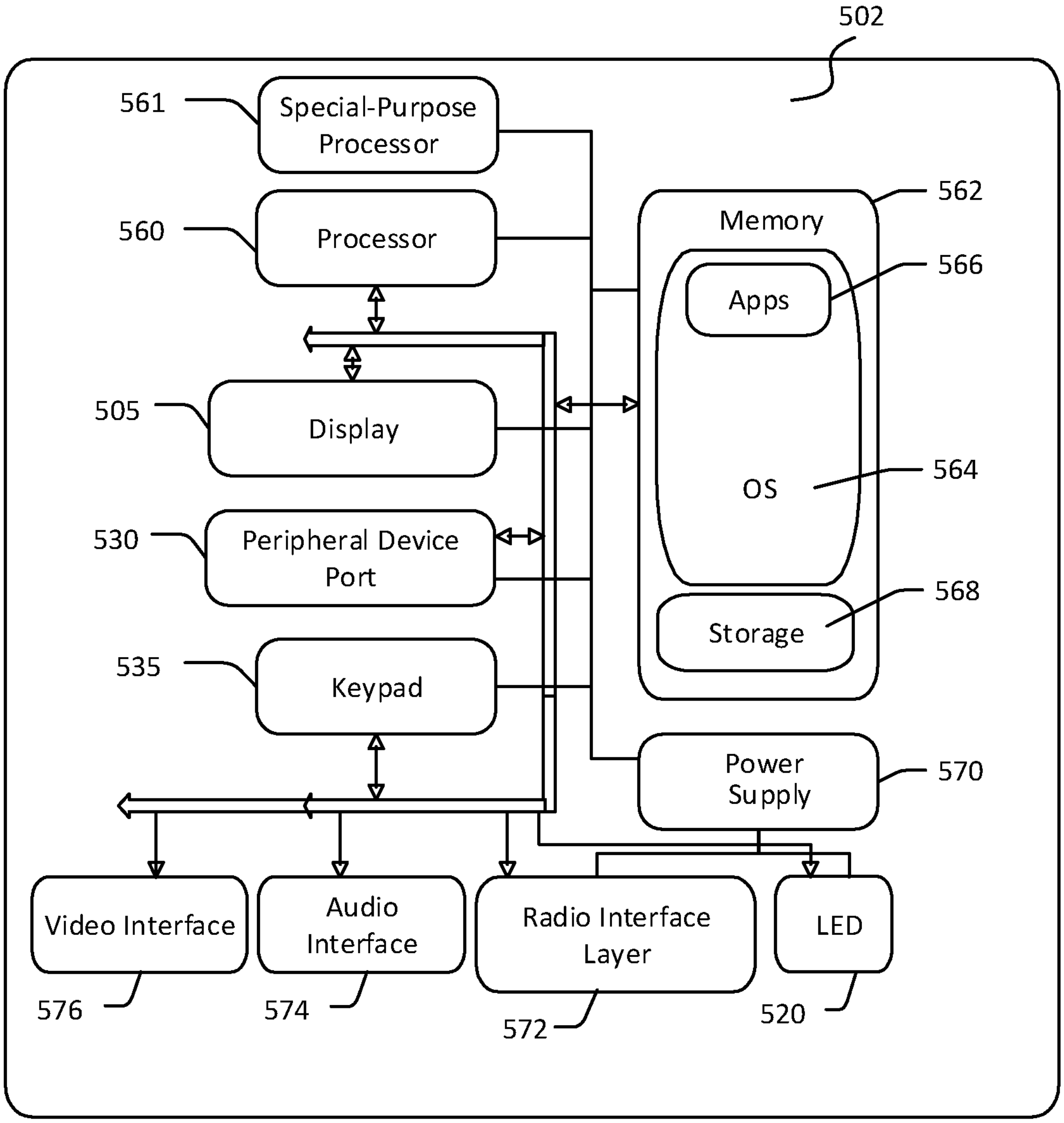

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
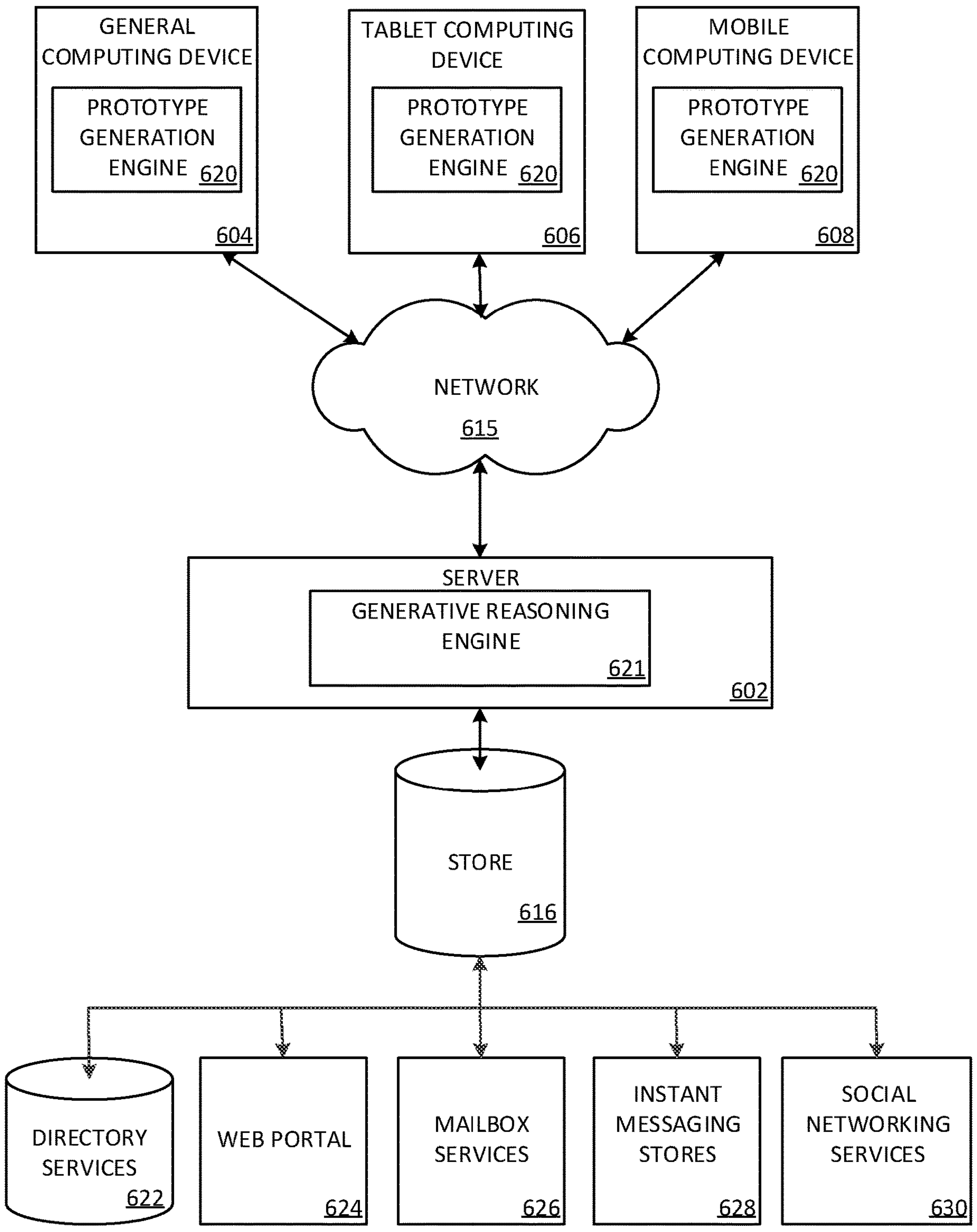
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A prototype generation engine 620 (e.g., performing aspects similar to those of operation 304 of method 300 in FIG. 3) may be employed by a client that communicates with server device 602, and/or generative reasoning engine 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
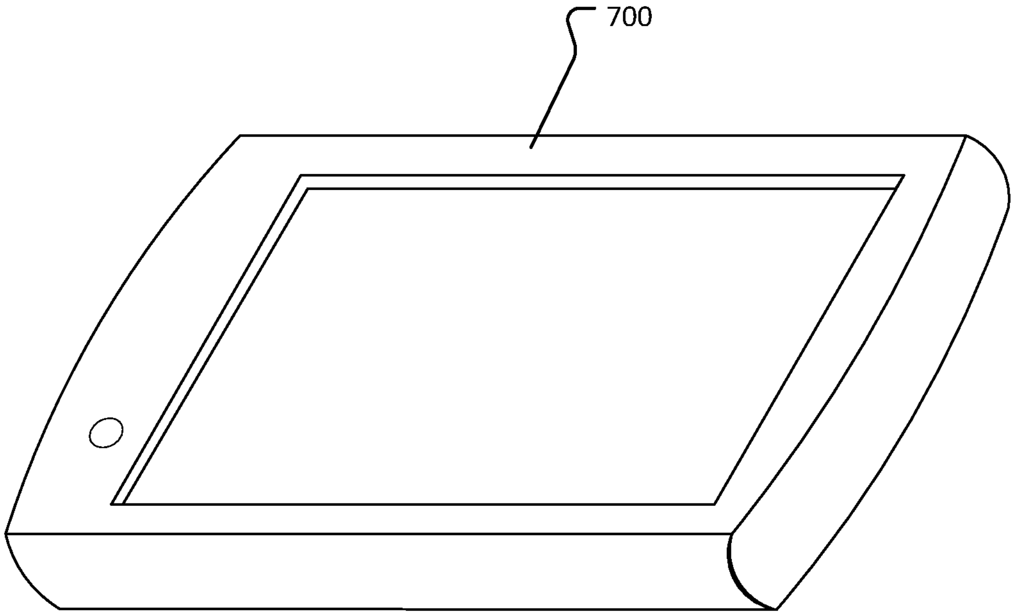
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a model output based on a set of concepts according to at least the examples provided in the sections below:

(A1) In one aspect, some embodiments include a system (e.g., 400, 500) comprising at least one processor (e.g., 402, 560, 561); and memory (e.g., 404, 562) storing instructions that, when executed by the at least one processor, causes the system to perform a set of operations (e.g., FIG. 3). The set of operations comprises: receiving (e.g., 302) an indication comprising a search query (e.g., 202) from a computing device (e.g., 104, 106); obtaining (e.g., 304), based on a knowledge corpus (e.g., 110, 114, 116), a prototype (e.g., 218) for a set of concepts (e.g., 216) associated with the search query; encoding (e.g., 208, 306) an input based on the set of concepts and the obtained prototype, the input comprising one or more concept input tokens for the set of concepts and one or more prototype input tokens for the obtained prototype; scaling (e.g., 210, 308) the encoded input to decrease a first norm for an encoded output state of a first prototype input token that is similar to a first concept input token of the concept input tokens; generating (e.g., 212, 310) a set of position indicators for input tokens of the input; decoding (e.g., 214, 312) the scaled encoded output based on the set of position indicators to generate a model output (e.g., 204); identifying, based on the generated model output (e.g., 204, 314), targeted content; and providing (e.g., 314), to the computing device, the identified targeted content in response to the received indication.

(A2) In some embodiments of A1, the prototype (e.g., 218) for the set of concepts (e.g., 216) is obtained (e.g., 302) based on a search result responsive to the received search query.

(A3) In some embodiments of A1-A2, generating (e.g., 212, 310) the set of position indicators comprises, for each input token: when the input token is a concept input token (e.g., 216), generating a position indicator of a first value; when the input token is a prototype input token (e.g., 218) that is similar to a concept input token, generating a position indicator of a second value that is greater than the first value; and when the input token is a prototype input token that is not similar to a concept input token, generating a position indicator of a third value that is greater than a position indicator value of a most proximate prototype input token that is similar to a concept input token.

(A4) In some embodiments of A1-A3, the third value is linearly determined based on a distance to the most proximate prototype input token that is similar to the concept input token.

(A5) In some embodiments of A1-A4, the search result responsive to the received search query is retrieved (e.g., 304) from the knowledge corpus (e.g., 110, 114, 116).

(A6) In some embodiments of A1-A5, the knowledge corpus is determined from a set of knowledge corpora (e.g., 110, 114, 116) based on the received search query.

(A7) In some embodiments of A1-A6, the knowledge corpus is one of an in-domain knowledge corpus (e.g., 114) or an out-of-domain knowledge corpus (e.g., 110, 116).

(B1) In another aspect, some embodiments include a system (e.g., 400, 500) comprising at least one processor (e.g., 402, 560, 561); and memory (e.g., 404, 562) storing instructions that, when executed by the at least one processor, causes the system to perform a set of operations (e.g., FIG. 3). The set of operations comprises: receiving (e.g., 302) a request (e.g., 202) comprising a set of concepts (e.g., 216); generating (e.g., 304) a prototype (e.g., 218) for the set of concepts based on a knowledge corpus (e.g., 110, 114, 116); encoding (e.g., 208, 306) an input that comprises a set of input tokens, wherein the set of input tokens comprises concept input tokens of the set of concepts and prototype input tokens of the prototype; generating (e.g., 212, 310) a set of position indicators for input tokens of the input, wherein each position indicator indicates a relative distance of an input token to a most proximate input token similar to a concept input token; decoding (e.g., 214, 312) the encoded output based on the set of position indicators to generate a model output (e.g., 204); and providing (e.g., 314), in response to the request, the generated model output.

(B2) In some embodiments of B1, the set of operations further comprises: scaling (210, 308) the encoded input to decrease a first norm for an encoded output state of a first prototype input token that is similar to a first concept input token of the concept input tokens.

(B3) In some embodiments of B1-B2, the knowledge corpus (e.g., 110, 114, 116) is one of an in-domain knowledge corpus (e.g., 114) or an out-of-domain knowledge corpus (e.g., 110, 116).

(C1) In a further aspect, some embodiments include a method (e.g., FIG. 3) for generating a model output (e.g., 204) based on a set of concepts (e.g., 202). The method comprises: generating (e.g., 304) a prototype (e.g., 218) for a set of concepts (e.g., 216) based on a knowledge corpus (e.g., 110, 114, 116); encoding (e.g., 208, 306) an input that comprises a set of input tokens, wherein the set of input tokens comprises concept input tokens of the set of concepts and prototype input tokens of the prototype; scaling (e.g., 210, 308) the encoded input to decrease a first norm for an encoded output state of a first prototype input token that is similar to a first concept input token of the concept input tokens; generating (e.g., 212, 310) a set of position indicators for input tokens of the input; and decoding (e.g., 214, 312) the scaled encoded output based on the set of position indicators to generate a model output.

(C2) In some embodiments of C1, the method further comprises: receiving (202, 302) an indication comprising a search query from a computing device; generating (302), based on the search query, the set of concepts (e.g., 216); and identifying, based on the generated model output (204, 314), targeted content; and providing (e.g., 314), in response to the indication, the identified targeted content.

(C3) In some embodiments of C1-C2, the method further comprises: receiving (e.g., 202, 302), from a computing device, the set of concepts as keywords associated with targeted content; and storing the model output (e.g., 204, 314) as one of a descriptive headline or descriptive summary associated with the targeted content.

(C4) In some embodiments of C1-C3, the knowledge corpus (e.g., 110, 114, 116) is one of an in-domain knowledge corpus (e.g., 114) or an out-of-domain knowledge corpus (e.g., 110, 116).

(C5) In some embodiments of C1-C4, the knowledge corpus is determined from a set of knowledge corpora (e.g., 110, 114, 116) based on the set of concepts.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, causes the system to perform a set of operations, the set of operations comprising:

receiving an indication comprising a search query from a computing device;

obtaining, based on a knowledge corpus, a prototype for a set of concepts associated with the search query;

encoding an input based on the set of concepts and the obtained prototype, the input comprising one or more concept input tokens for the set of concepts and one or more prototype input tokens for the obtained prototype;

scaling the encoded input to decrease a first norm for an encoded output state of a first prototype input token that is similar to a first concept input token of the concept input tokens;

generating a set of position indicators for input tokens of the input;

decoding the scaled encoded output based on the set of position indicators to generate a model output;

identifying, based on the generated model output, targeted content; and providing, to the computing device, the identified targeted content in response to the received indication.

2. The system of claim 1, wherein the prototype for the set of concepts is obtained based on a search result responsive to the received search query.

3. The system of claim 1, wherein generating the set of position indicators comprises:

for each input token:

when the input token is a concept input token, generating a position indicator of a first value;

when the input token is a prototype input token that is similar to a concept input token, generating a position indicator of a second value that is greater than the first value; and when the input token is a prototype input token that is not similar to a concept input token, generating a position indicator of a third value that is greater than a position indicator value of a most proximate prototype input token that is similar to a concept input token.

4. The system of claim 3, wherein the third value is linearly determined based on a distance to the most proximate prototype input token that is similar to the concept input token.

5. The system of claim 2, wherein the search result responsive to the received search query is retrieved from the knowledge corpus.

6. The system of claim 5, wherein the knowledge corpus is determined from a set of knowledge corpora based on the received search query.

7. The system of claim 1, wherein the knowledge corpus is one of an in-domain knowledge corpus or an out-of-domain knowledge corpus.

8. The system of claim 1, wherein scaling the encoded input further comprises increasing a second norm for an encoded output state of a second prototype input token that is likely to contribute to the model output.

9. A system comprising:

at least one processor; and memory storing instructions that, when executed by the at least one processor, causes the system to perform a set of operations, the set of operations comprising:

receiving a request comprising a set of concepts;

generating a prototype for the set of concepts based on a knowledge corpus;

encoding an input that comprises a set of input tokens, wherein the set of input tokens comprises concept input tokens of the set of concepts and prototype input tokens of the prototype;

generating a set of position indicators for input tokens of the input, wherein each position indicator indicates a relative distance of an input token to a most proximate input token similar to a concept input token;

decoding the encoded input based on the set of position indicators to generate a model output; and providing, in response to the request, the generated model output.

10. The system of claim 9, wherein the set of operations further comprises:

scaling the encoded input to decrease a first norm for an encoded output state of a first prototype input token that is similar to a first concept input token of the concept input tokens.

11. The system of claim 9, wherein the knowledge corpus is one of an in-domain knowledge corpus or an out-of-domain knowledge corpus.

12. A method for generating a model output based on a set of concepts, the method comprising:

generating a prototype for a set of concepts based on a knowledge corpus;

encoding an input that comprises a set of input tokens, wherein the set of input tokens comprises concept input tokens of the set of concepts and prototype input tokens of the prototype;

scaling the encoded input to decrease a first norm for an encoded output state of a first prototype input token that is similar to a first concept input token of the concept input tokens;

generating a set of position indicators for input tokens of the input; and decoding the scaled encoded output based on the set of position indicators to generate a model output.

13. The method of claim 12, further comprising:

receiving an indication comprising a search query from a computing device;

generating, based on the search query, the set of concepts; and identifying, based on the generated model output, targeted content; and providing, in response to the indication, the identified targeted content.

14. The method of claim 12, further comprising:

receiving, from a computing device, the set of concepts as keywords associated with targeted content; and storing the model output as one of a descriptive headline or descriptive summary associated with the targeted content.

15. The method of claim 12, wherein the knowledge corpus is one of an in-domain knowledge corpus or an out-of-domain knowledge corpus.

16. The method of claim 15, wherein the knowledge corpus is determined from a set of knowledge corpora based on the set of concepts.

17. The method of claim 12, further comprising performing an encoder classification task to determine at least one prototype input token to include in the model output.

18. The method of claim 12, wherein scaling the encoded input comprises generating a scaling factor based on trainable parameters applied to the encoded output state using a sigmoid function.

19. The method of claim 12, wherein scaling the encoded input comprises element-wise multiplying the encoded output state by a scaling factor.

20. The method of claim 12, wherein a position indicator for a respective input token of the input tokens is based on a proximity of the respective input token to a most proximate concept input token.

* * * * *